(12) United States Patent
Oldorff

(10) Patent No.: US 8,512,804 B2
(45) Date of Patent: Aug. 20, 2013

(54) METHOD AND APPARATUS FOR FINISHING A WOOD PANEL

(75) Inventor: Frank Oldorff, Schwerin (DE)

(73) Assignee: Flooring Technologies Ltd., Pieta (MT)

(*) Notice: Subject to any disclaimer, the term of this patent is extended or adjusted under 35 U.S.C. 154(b) by 176 days.

(21) Appl. No.: 13/119,634

(22) PCT Filed: Oct. 8, 2010

(86) PCT No.: PCT/EP2010/006146
§ 371 (c)(1),
(2), (4) Date: May 5, 2011

(87) PCT Pub. No.: WO2011/076305
PCT Pub. Date: Jun. 30, 2011

(65) Prior Publication Data
US 2011/0217463 A1    Sep. 8, 2011

(30) Foreign Application Priority Data

Dec. 23, 2009 (EP) .................................. 09015939

(51) Int. Cl.
*B05D 1/00* (2006.01)
(52) U.S. Cl.
USPC ............................................................ 427/209
(58) Field of Classification Search
USPC ............................................................ 427/209
See application file for complete search history.

(56) References Cited

U.S. PATENT DOCUMENTS

| | | | | | |
|---|---|---|---|---|---|
| 2,232,718 | A | * | 2/1941 | Nevin | 156/315 |
| 3,540,978 | A | * | 11/1970 | Ames | 428/325 |
| 2003/0091793 | A1 | * | 5/2003 | Morton | 428/143 |
| 2004/0191547 | A1 | * | 9/2004 | Oldorff | 428/479.3 |
| 2007/0116927 | A1 | * | 5/2007 | Schitter et al. | 428/143 |
| 2007/0207290 | A1 | | 9/2007 | Oldorff | |

FOREIGN PATENT DOCUMENTS

| | | |
|---|---|---|
| DE | 102007003746 | 7/2008 |
| EP | 1454763 | 9/2004 |
| EP | 1977909 | 10/2008 |
| EP | 2098304 | 9/2009 |
| WO | WO2005/116361 | 12/2005 |

OTHER PUBLICATIONS

International Preliminary Report on Patentability for Application No. PCT/EP2010/006146 dated Jul. 10, 2012 (date of issue), Jul. 19, 2012 (date of mailing).

* cited by examiner

*Primary Examiner* — Nathan Empie

(74) *Attorney, Agent, or Firm* — Andrew M. Calderon; Roberts Mlotkowski Safran & Cole, P.C.

(57) ABSTRACT

A method for finishing an engineered wood board. The method includes: cleaning the top and bottom, applying a first top resin layer, which contains corundum particles, to the top and a first bottom resin layer to the bottom, drying the first top and first bottom resin layers to a residual moisture content of 3% to 6%, applying a second top resin layer, which contains cellulose, to the top and a second bottom resin layer to the bottom, drying the second top and second bottom resin layers to a residual moisture content of 3% to 6%, applying an at least third top resin layer, which contains glass particles, to the top and an at least third bottom resin layer to the bottom, drying the third top and third bottom resin layers to a residual moisture content of 3% to 6%, and pressing the multilayer structure under pressure and heat.

17 Claims, 3 Drawing Sheets

METHOD AND APPARATUS FOR FINISHING A WOOD PANEL

FIELD OF THE INVENTION

The invention relates to a method for finishing an engineered wood board comprising a decor on at least the top and/or the bottom.

DISCUSSION OF BACKGROUND INFORMATION

Such engineered wood boards are widely used in many different fields. A particularly significant field of use is use as a floor panel. With this use in particular the engineered wood boards are exposed to immense loading in particular as a result of being walked on. To ensure that they withstand this loading, the decorative layer has to be covered with a protective layer. This generally consists of a synthetic resin, for example melamine resin, to which various additives have been added. The various layers applied to the engineered wood board result in tensile stresses, which may lead to cupping of the engineered wood board. Therefore, both the top and bottom of the engineered wood board may be coated to allow these forces to occur evenly on both sides and thus to avoid cupping.

Application of the synthetic resin layer to the engineered wood board may proceed in a very wide range of ways. It is known, for example, to apply the synthetic resin as granules or powder to the side of the engineered wood board to be coated and to sprinkle in any additives provided. During final pressing, the powder applied melts under the action of pressure and heat and forms a homogeneous layer. In this method bilateral coating of the engineered wood board is of course impossible, since the sprinkled-on powder merely lies on the surface of the engineered wood board and is only bonded therewith during pressing.

It is known from EP 1 454 763 A2 to apply a protective layer of melamine resin to the decor on the top of an engineered wood board. At the same time, a protective layer of melamine resin is likewise to be applied to the bottom of the engineered wood board. The applied resin layers are then intended to melt during pressing and so enclose the decor.

EP 2 098 304 A2 describes the use of liquid resin, which is applied to both the top and bottom of the engineered wood board.

SUMMARY OF THE INVENTION

Taking this statement of the problem as basis, the intention is to improve the above-described method for finishing an engineered wood board.

The problem is solved by a method of the above type having the following steps:
a) cleaning the top and bottom of the engineered wood board,
b) applying a first top resin layer, which contains corundum particles, to the top and a first bottom resin layer to the bottom of the engineered wood board,
c) drying the first top resin layer and the first bottom resin layer to a residual moisture content of 3% to 6%,
d) applying a second top resin layer, which contains cellulose, to the top and a second bottom resin layer to the bottom of the engineered wood board,
e) drying the second top resin layer and the second bottom resin layer to a residual moisture content of 3% to 6%,
f) applying an at least third top resin layer, which contains glass particles, to the top and an at least third bottom resin layer to the bottom of the engineered wood board,
g) drying the third top resin layer and the third bottom resin layer to a residual moisture content of 3% to 6%,
h) pressing the multilayer structure under the action of pressure and heat.

By cleaning the top and the bottom of the engineered wood board in the first method step, dust or other impurities, which have become attached to the relevant sides of the engineered wood board during storage or preceding production steps, are reliably removed. This is important for ensuring that even resin layers requiring very thin application are applied uniformly and homogeneously to the top and no unevennesses or inclusions arise in these layers.

The corundum particles in the first top resin layer increase the abrasion resistance of this layer. This is of the greatest importance in particular in the event of use as a floor panel in order to withstand the abovementioned loading to which a floor panel is exposed. The corundum in this case assumes the form, for example, of a mixture of conventional varieties of silanized corundum of different grain sizes and may simply be added to the resin. A first bottom resin layer is applied to the bottom of the engineered wood board, so compensating the tensile forces acting on the engineered wood board as a result of the first top resin layer. The first bottom resin layer may in particular be colored. Both resin layers may have additives added to them, such as for example curing agents or wetting or release agents. The first top resin layer and the first bottom resin layer are then dried, to ensure clean application of a next resin layer. Drying proceeds for example by means of hot air, wherein the resin is dried and the chemical crosslinking reaction of the melamine resin is stopped. In the process, water is extracted from the coating compound and the latter is adjusted to a residual moisture content of for instance 3% to 6%. The other resin layers applied are brought to said residual moisture content during their respective drying operations.

The cellulose which is present in the second top resin layer assumes the form of conventional commercial fibers which may likewise be added to the resin layers to be applied. The glass introduced in the third top resin layer assumes the form of conventional commercial microglass beads. These are also easy to store and to introduce into the resin layer to be applied. The resin layers applied to the bottom of the engineered wood board may be colored. All the resin layers may have additives such as curing agents or wetting and release agents added to them.

Drying to a residual moisture content of 3% to 6% stops the crosslinking process of the applied resin layers. During subsequent pressing under the action of pressure and heat, the resin layers melt again and the crosslinking process continues. This ensures that the individual resin layers are not only themselves crosslinked but are also crosslinked to one another and may thus be pressed into a large laminate. Conventional short-cycle presses operate for example at a pressure of 30 to 60 kg/cm$^2$, a temperature at the engineered wood surface of for instance 165° C. and a pressing time of 6 to 12 seconds. In this way, the melamine resin layers applied are crosslinked, enclosing the decor. If textured pressing plates are used, textures may also be embossed into the resin layers, in addition to the decor. These may be largely congruent with the decor, in which case they are known as Embossed-In-Register textures.

The third top resin layer preferably contains glass particles in a proportion of 20%. For the second top resin layer 5% cellulose has for instance proven advantageous. The first top resin layer contains in particular 20% corundum particles.

Advantageously the top resin layers and the bottom resin layers are applied in an amount of from 20 to 50 g/m². Because the melamine resin layers applied in each case to the top and bottom are applied in equal amounts, it is at the same time ensured that the tensile forces to which the engineered wood board is exposed during drying due to the applied layers cancel each other out. The counter layer applied to the bottom of the engineered wood board thus precisely matches the layer sequence applied to the top in layer structure and respective layer thickness. As a result of this small amount applied of 20 to 50 g/m², it is ensured at the same time that no curtaining arises in particular on the bottom of the engineered wood board.

The top resin layers and the bottom resin layers may contain a 60% synthetic resin solution.

A primer and an undercoat may be applied under the decor of the engineered wood board to be finished. The decor has been printed onto this undercoat and covered with a covering. Alternatively, the decor may be applied to the engineered wood board by lamination in the form of a decorative paper layer.

A device for finishing an engineered wood board, at least a top and/or a bottom of the engineered wood board comprising a decor, comprises the following according to the invention:

a) a first double-sided application device, b) a first drying device arranged downstream of the first double-sided application device in a processing direction, c) a second double-sided application device arranged downstream of the first drying device in the processing direction, d) a second drying device arranged downstream of the second double-sided application device in the processing direction, e) at least one third double-sided application device arranged downstream of the second drying device in the processing direction, f) at least one third drying device arranged downstream of the at least one third double-sided application device in the processing direction and g) a short-cycle press, each double-sided application device comprising a top application device for applying a resin layer to the top of the engineered wood board and a bottom application device for applying a resin layer to the bottom of the engineered wood board and each top application device and each bottom application device in each case comprising a mixing vessel, in which the resin to be applied in each case may be mixed with at least one additive.

The engineered wood boards provided with the decor and requiring finishing are introduced into such a device. The top and bottom of the engineered wood board are coated simultaneously with a resin layer in the at least three double-sided application devices. This shortens the production time and thus reduces manufacturing costs. By means of the drying devices provided downstream of the double-sided application devices, in which drying devices the engineered wood boards just coated are dried down to the desired residual moisture content, for example by hot air, it is quickly made possible to apply the in each case first resin layer and to bring the crosslinking process of the resin layers applied to a standstill at an early stage. Intermediate storage of the coated engineered wood boards to dry the resin layers or turning of the engineered wood boards to allow coating of the other side too is no longer necessary.

Because both each top application device and each bottom application device comprises a mixing vessel, in which the resin to be applied in each case may be mixed with the desired additives, it is possible to make particularly rapid adjustments between different product requirements, for example the desired abrasion class. It is possible to dispense with protracted changeovers or holding large amounts of different resin/additive mixtures in stock, so meaning that both the amounts of material needing to be held in stock and the space requirement of the installation are markedly reduced. At the same time, different product properties, for example surface smoothness, or acid or abrasion resistance may be adjusted rapidly and straightforwardly. In addition, the use of highly reactive resin mixtures is also possible, since intermediate storage of the coated engineered wood boards is no longer necessary, continuous processing taking place instead. In this way, the cycle times of the short-cycle press are also reduced markedly, resulting in a further reduction in manufacturing costs.

A device according to the invention preferably comprises a storage magazine with a plurality of storage vessels, in which the resin to be applied and the additives may be stored separately from one another, and feed lines from the storage vessels to the mixing vessels. In this way, the resin and the additives may be conveyed separately from one another into the mixing vessels and mixed only at this point into the desired resin layer to be applied.

The device may in particular comprise a controller, which is designed to control the amount of resin and of additives conveyed by the feed lines into the mixing vessels. This makes possible automatic adjustment of various product properties and application amounts or rates of addition.

Each top application device and each bottom application device may here be an application roller set, so ensuring a constant and finely adjustable layer thickness. In addition, application of the applied layers takes place very homogeneously and uniformly in this way.

Peristaltic pumps may be provided to pump the contents of the mixing vessels to the respective top and bottom application devices. This increases the service life of the device by up to 20 times compared with if diaphragm pumps are used. In addition, the hoses of the peristaltic pumps may be simply and quickly replaced by a quick change system, so markedly reducing the time expended on maintenance and repair of the device.

It is preferably possible for at least one hold-down member for the engineered wood board to be arranged upstream of each double-sided application device. In this way, any deformation of the engineered wood board which may occur during production may be remedied and the engineered wood board to be coated may be fed accurately and reproducibly to the respective double-sided application device.

To convey the engineered wood boards inside the device a pointed bar conveyor is used, in the form of pointed bar conveyor chains, which are themselves robust and not liable to break down and which ensure a high surface quality of the coated engineered wood board. The pointed bars may be cleaned automatically by means of cleaning brushes.

Transfer of an engineered wood board from a double-sided application device to the conveyor chain and vice versa here proceeds by means of sheaves. On entry into a double-sided application device or a drying device, the above-described hold-down members in the form of sheaves are additionally used.

In addition, a device for finishing an engineered wood board may comprise further double-sided application devices, with which the overall layer thickness and the number and proportions of functional additives may be increased. In this way, products may also be produced which may be assigned to higher usage classes. The same is true of the method according to the invention, in which more than three resin layers may likewise be applied to the top and bottom of the engineered wood board to be coated.

If an electrical, in particular computer-aided, controller is used to control a device as described herein, it is possible to achieve a high level of reproducibility of the resin layers applied, since both the mixing proportions of resin and additives and also the temperature control means, for example of the drying devices and the short-cycle press, are controlled automatically. In this way, a high quality standard may be achieved for the products produced in this manner. In addition, different states of curvature of the engineered wood board to be coated, which may arise for example due to the application of different undercoat and decor layers, may be automatically compensated by adjustment of the amounts applied to the top and/or bottom.

BRIEF DESCRIPTION OF THE DRAWINGS

An exemplary embodiment of the device according to the invention will now be explained in greater detail with reference to drawings, in which.

DETAILED DESCRIPTION OF THE PRESENT INVENTION

Figure 1:
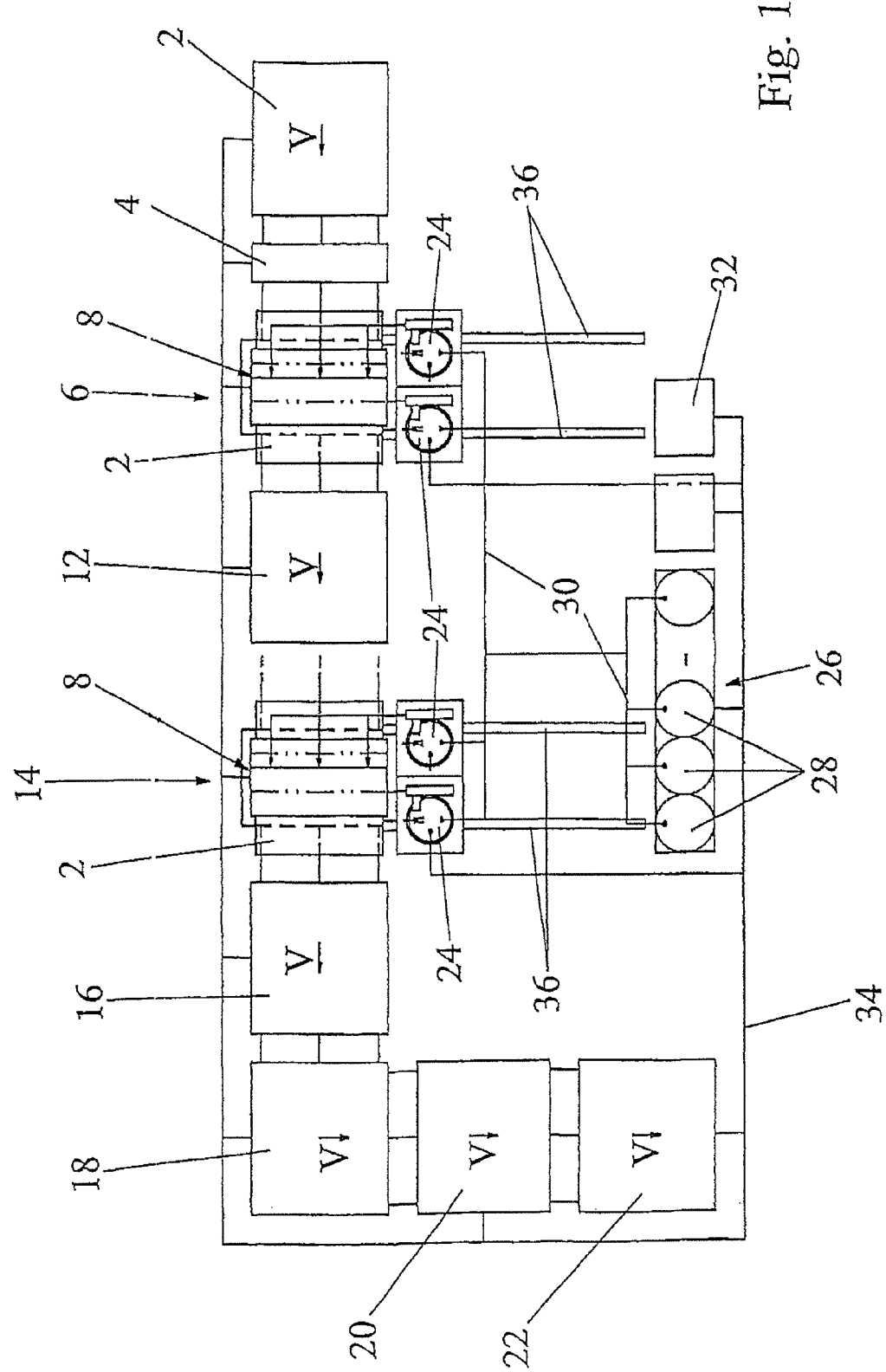
FIG. 1 is a schematic plan view of an exemplary embodiment of a device according to the invention.

FIG. 1 shows a device according to the invention in a schematic plan view. The engineered wood boards 2 to be finished are introduced into the device from the top right in FIG. 1. First of all, the top and bottom of the engineered wood boards 2 are cleaned in a cleaning device 4. Then, the engineered wood boards 2 are fed to the first double-sided application device 6. The first double-sided application device 6 comprises a top application device 8 and a bottom application device 10, which in the exemplary embodiment shown take the form of application roller sets. In these application roller sets a resin layer is applied to the top and bottom of the engineered wood board to be coated.

Once the engineered wood boards 2 have passed through the first double-sided application device 6, they reach the first drying device 12. Here the resin layers applied in the first double-sided application device 6 are dried down to a residual moisture content of 3% to 6%.

A second double-sided application device and a second drying device are not shown in FIG. 1 for reasons of space and clarity. These adjoin the first drying device 12 in the processing direction V, which is indicated by small arrows in FIG. 1.

In FIG. 1 a third double-sided application device 14 follows in the processing direction V. This is of identical construction to the first double-sided application device 6. Once the engineered wood boards 2 have passed through the third double-sided application device 14, the resin layers applied in the third double-sided application device 14 are dried down in a third drying device 16 to a residual moisture content of 3% to 6%. Then the engineered wood boards pass through the processing stations indicated merely as squares in FIG. 1, involving intermediate stacking 18, pressing in a short-cycle press 20 and quality control 22.

Both the first double-sided application device 6 and the second double-sided application device 14 each have two mixing vessels 24, of which in each case one is assigned to the top application devices 8 and one to the bottom application device 10. In these mixing vessels 24 the resin to be applied in the respective application devices 8, 10 is mixed with the desired additives.

These ingredients are stored separately from one another in a storage magazine 26 in various storage vessels 28. Each of these storage vessels 28 is connected to the mixing vessels 24 via a feed line 30. The desired ingredients are conveyed to the mixing vessels 24 via these feed lines 30. In FIG. 1 the quantity of the individual ingredients is controlled by an electrical controller 32, which is connected via control lines 34 both to the storage magazine 26 and to the mixing vessels 24. This makes it possible to achieve a high quality standard and excellent reproducibility of the resin layers applied.

In FIG. 1 both the first double-sided application device 6 and the third double-sided application device 14 are mounted on rails 36. The same is true of all the double-sided application devices which are not shown. In this way they may be straightforwardly moved out of the production line for maintenance or repair or if they are not needed for the desired layer structure and subsequently moved back in again.

Figure 2:
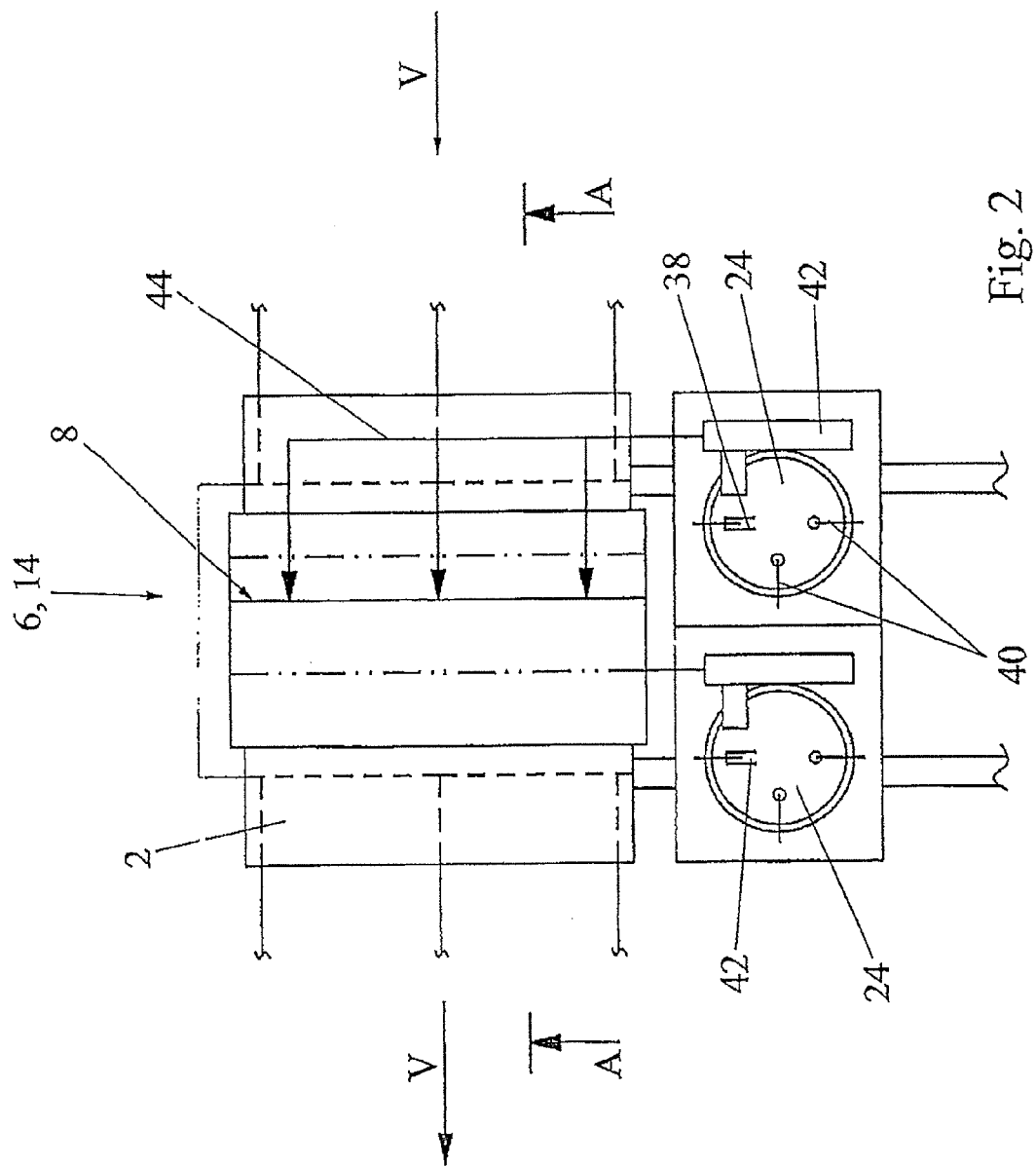
FIG. 2 is a schematic plan view of a double-sided application device and FIG. 3 shows the section along line A-A in FIG. 2.

FIG. 2 shows a schematic plan view of one of the double-sided application devices 6, 14 shown in FIG. 1. The engineered wood board 2 is fed in the processing direction V to the double-sided application device 6, 14. The double-sided application device 6, 14 shown comprises a top application device 8, which in FIG. 2 takes the form of an application roller set. The same is true of the bottom application device 10, which, as in FIG. 1 above, is not shown in FIG. 2. The double-sided application device 6, 14 in FIG. 2 comprises two mixing vessels 24, the right-hand one of which is assigned to the top application device 8. The synthetic resin/additive mixture desired for the top application device 8 is produced therein using an agitator 38. The ingredients for this mixture are fed via feed lines, not shown, from the storage vessels 28 of the storage magazine 26 of FIG. 1 to the mixing vessel 24. Both the filling level and the temperature of the mixture are detected by way of sensors 40. The material mixed in the right-hand mixing vessel 24 is fed by way of a peristaltic pump 42 via material feed lines 44 to the top application device 8.

Figure 3:
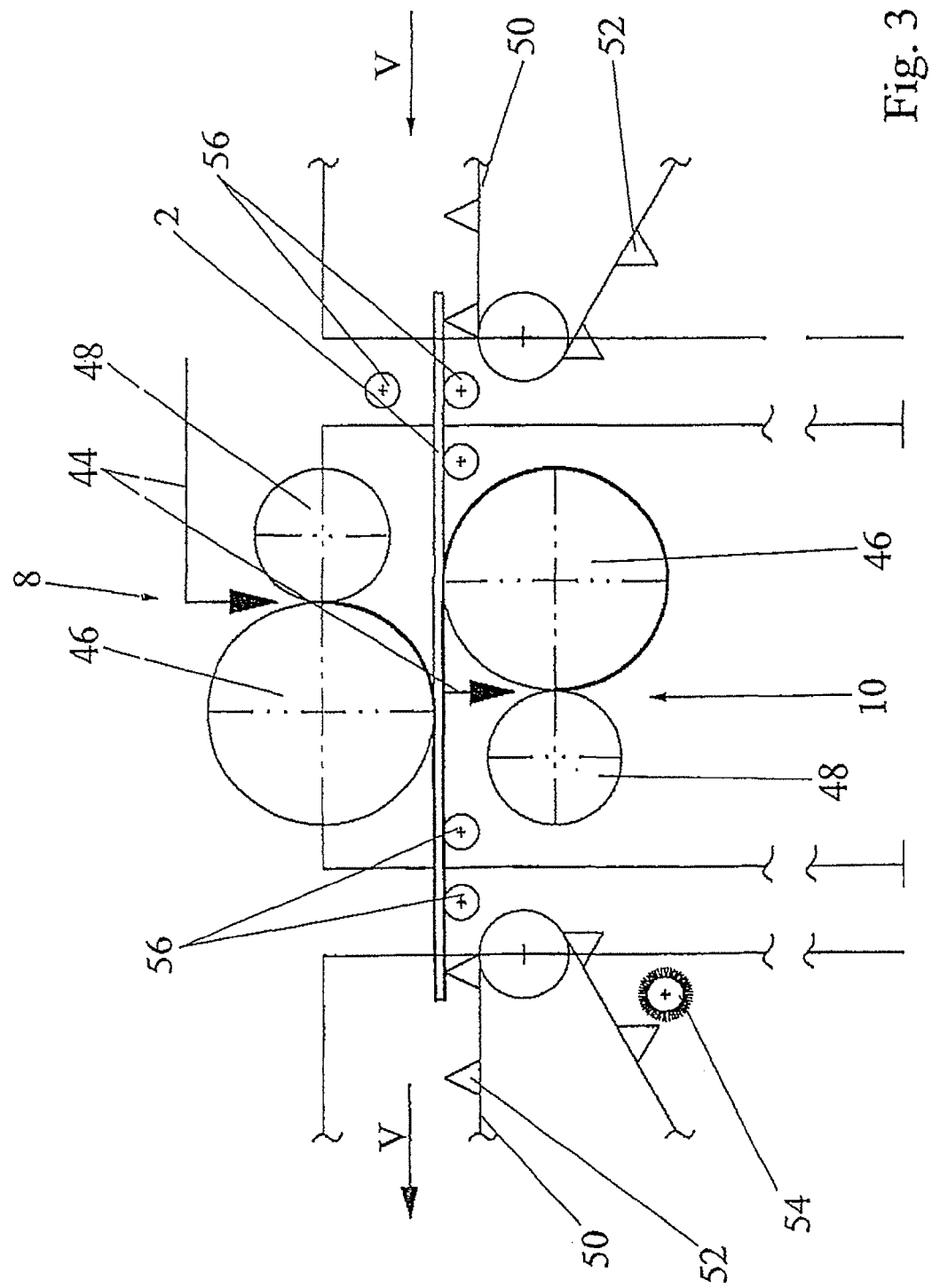

FIG. 3 shows a section along line A-A according to FIG. 2. The top application device 8 and the bottom application device 10 each take the form of application roller sets, which each have an application roller 46 and a metering roller 48. Along the material feed lines 44, which in FIG. 3 as in FIG. 2 are provided with an arrow at the end, the material to be applied, which has been mixed in the mixing vessels 24, is introduced between the application roller 46 and the metering roller 48. It is applied by the application roller 46 to the top or bottom of the introduced engineered wood board 2. The engineered wood board 2 is conveyed both upstream and downstream of the double-sided application device 6, 14 shown via a "pointed bar conveyor" 50. Because this apparatus 50 has only very few very small-area contact points with the engineered wood board 2, the good quality of the already coated engineered wood board is ensured. The individual pointed bars 52 are cleaned by means of automatic cleaning brushes 54.

To ensure reproducible and accurate feed of the engineered wood board 2 into the application device 6, 14, hold-down members 56 may be arranged upstream and downstream of the respective application devices 8, 10.

In this way it is ensured that the layers may be applied reproducibly and accurately to the top and bottom of the engineered wood board 2.

The further double-sided application devices not shown in FIGS. 1 to 3 are of like construction. By means of the rails 36 shown in FIG. 1 they may be introduced simply and without major effort into the production line or moved out therefrom. They also make it possible to change the device over quickly and simply to the finishing of engineered wood boards with a different layer structure.

The invention claimed is:

1. A method for finishing an engineered wood board comprising a decor on at least a top and/or a bottom, comprising in order:
   (a) cleaning the top and bottom of the engineered wood board,
   (b) applying a first top resin layer, which contains corundum particles, to the top and a first bottom resin layer to the bottom of the engineered wood board,
   (c) drying the first top resin layer and the first bottom resin layer to a residual moisture content of 3% to 6% by weight,
   (d) applying a second top resin layer, which contains cellulose, to the top and a second bottom resin layer to the bottom of the engineered wood board,
   (e) drying the second top resin layer and the second bottom resin layer to a residual moisture content of 3% to 6% by weight,
   (f) applying an at least third top resin layer, which contains glass particles, to the top and an at least third bottom resin layer to the bottom of the engineered wood board,
   (g) drying the third top resin layer and the third bottom resin layer to a residual moisture content of 3% to 6% by weight, and
   (h) pressing the multilayer structure under action of pressure and heat; and where the composition of the first, second, and third top resin layers are different.

2. The method as claimed in claim 1, wherein the at least third top resin layer contains about 20% glass by weight.

3. The method as claimed in claim 1, wherein the second top resin layer contains about 5% cellulose by weight.

4. The method as claimed in claim 1, wherein the first top resin layer contains about 20% corundum particles by weight.

5. The method as claimed in claim 1, wherein each of the first, second and at least third top resin layers are applied in an amount of 20 to 50 g/m$^2$, and each of the first, second and at least third bottom resin layers are applied in an amount of 20 to 50 g/m$^2$.

6. The method as claimed in claim 1, wherein the first, second and at least third top resin layers and the first, second and at least third bottom resin layers contain a 60% synthetic resin solution by weight.

7. The method as claimed in claim 1, wherein a primer and an undercoat are applied under the decor of the engineered wood board to be finished and the decor is printed onto the undercoat and covered with a covering.

8. The method as claimed in claim 1, wherein the decor is applied to the engineered wood board by lamination in the form of a decorative paper layer.

9. The method as claimed in claim 1, wherein:
   the applying of the first top resin layer and the first bottom resin layer is provided simultaneously;
   the applying of the second top resin layer and the second bottom resin layer is provided simultaneously; and
   the applying of the third top resin layer and the third bottom resin layer is provided simultaneously.

10. The method as claimed in claim 9, wherein the applying steps performed in claim 9 are provided by at least three double sided application devices.

11. The method as claimed in claim 1, wherein the drying steps are performed by hot air to stop cross linking processes.

12. The method as claimed in claim 1, wherein at least the first, second and third top resin layers are reactive resin mixtures and the pressing is provided in a short cycle press.

13. The method as claimed in claim 1, wherein:
   at least the first, second and third top resin layers are stored and mixed in different mixing vessels prior to application, of which each one is assigned to a different top application roller device; and
   desired ingredients for each of the first, second and third top resin layers are stored in a respective storage magazine and provided to the different mixing vessels prior to the application for agitation.

14. The method as claimed in claim 13, wherein a temperature and filling level of the first, second and third top resin layers are monitored in the different mixing vessels.

15. The method as claimed in claim 1, wherein:
   the applying the first top resin layer and the first bottom resin layer is provided simultaneously with a first double-sided roller application device,
   the drying the first top resin layer and the first bottom resin layer is provided using a first drying device arranged downstream of the first double-sided application device in a processing direction to stop cross linking,
   the applying the second top resin layer and the second bottom resin layer is provided simultaneously with a second double-sided roller application device in the processing direction,
   drying the second top resin layer and the second bottom resin layer is provided using a second drying device arranged downstream of the second double-sided application device in the processing direction to stop cross linking,
   applying the at least third top resin layer and the at least third bottom resin layer is provided simultaneously with a third double-sided roller application device arranged downstream of the second drying device in the processing direction,
   drying the third top resin layer and the third bottom resin layer is provided using at least one third drying device arranged downstream of the at least one third double-sided application device in the processing direction to stop cross linking, and
   the pressing the multilayer structure under action of pressure and heat is provided in a short-cycle press.

16. The method as claimed in claim 15, further comprising continuing cross linking processes during the pressing step.

17. The method as claimed in claim 1, further comprising adding curing agents, wetting agents or release agents to the first top resin layer and the first bottom resin layer.

* * * * *